July 22, 1958 J. W. RIEKE ET AL 2,844,719

ENVELOPE DETECTOR

Filed Aug. 11, 1954

INVENTORS J. W. RIEKE
A. SLOCUM

BY W. L. Keefauver

ATTORNEY

United States Patent Office 2,844,719
Patented July 22, 1958

2,844,719

ENVELOPE DETECTOR

John W. Rieke, Basking Ridge, and Allan Slocum, Westfield, N. J., assignors to Bell Telephone Laboratories, Incorporated, New York, N. Y., a corporation of New York Application August 11, 1954, Serial No. 449,144

3 Claims. (Cl. 250—27)

Figure 1:
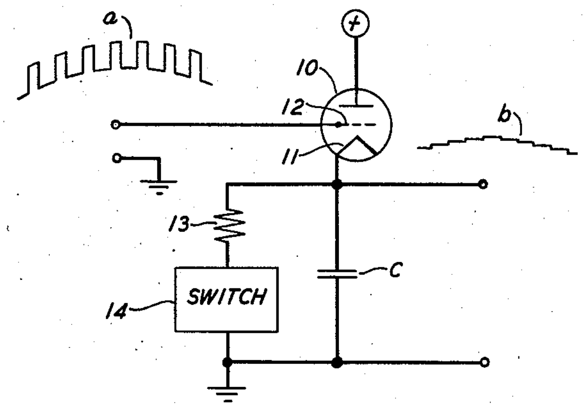

This invention relates to detectors. In the specific embodiments described below for purposes of illustration, it relates to detectors for deriving from a train of electrical pulses a wave which varies in accordance with the low frequency variation in amplitude of said pulses.

A problem in the transmission of television signals is the transmission of very low frequencies without distortion. Due to various reasons including, for example, low frequency cut-offs in the transmission medium, the transmitted video wave often acquires low frequency distortion which, if unmodified, would seriously impair picture quality at a receiver. To reduce this type of distortion, classes of circuits known as direct-current reinserters or restorers and clampers have been developed to reduce low frequency distortion by returning to the transmitted wave direct-current components which may have been lost in transmission and by eliminating, insofar as possible, low frequency distortion.

Clampers in general operate on the principle of deriving the distortion wave form from the transmitted wave and then recombining the derived wave in a subtractive manner with the transmitted wave. This may be accomplished either by series or shunt elements.

Described in more detail below is a so-called envelope detector having utility, for example, in a shunt clamper of the feedback type such as is disclosed in J. W. Rieke Patent 2,630,486 dated March 3, 1953, or in a copending application of J. W. Rieke, Serial No. 449,229, filed August 11, 1954. In this type of clamper which shunts the transmission line, the picture signal is stripped from the video wave so that nothing remains but the synchronizing pulses. The synchronizing pulses serve as a reference since, in the absence of distortion, these pulses have a constant amplitude. The envelope detector then derives from the synchronizing pulses the low frequency distortion wave which is then fed back on to the line with proper amplitude and phase to cancel the low frequency distortion in the signal. Since the distortion can be sampled only during a portion of the signal wave having a known reference value such as the synchronizing pulses, the derived wave is a quantized version of the low frequency distortion.

An object of the present invention is to improve envelope detectors of the type described above.

More particularly, it is an object of the invention to render envelope detectors relatively insensitve to variations in either pulse width or repetition rate.

Another object of the invention is to increase the frequency response of an envelope detector both to trains of pulses whose amplitude is increasing and to those whose amplitude is decreasing.

In accordance with a specific embodiment described below, a condenser connected in the cathode circuit of a vacuum tube is charged up to the tip of each synchronizing pulse. A gated discharge circuit, driven by the same pulses, holds the charge on the condenser between pulses and permits the condenser to discharge only during the synchronizing pulse interval. The charging and discharging rates are balanced so that the circuit is rendered insensitive to variations in either pulse width or repetition rate.

Figure 2:
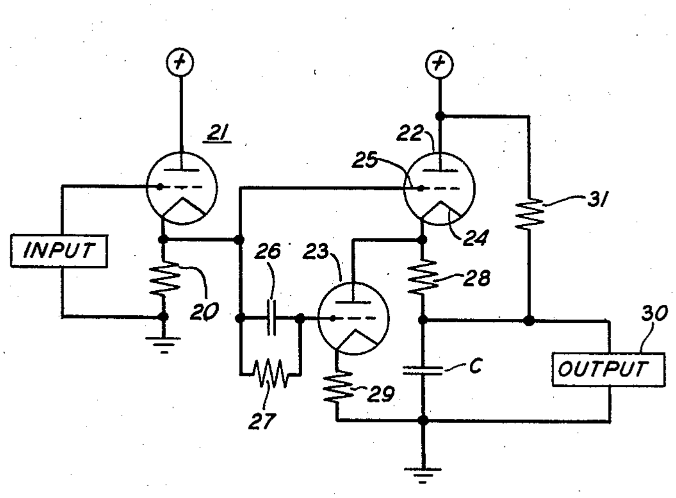

Other objects and features of the invention may be more readily understood from a consideration of the following detailed description when read in accordance with the attached drawing, in which:

Fig. 1 is a functional representation of an envelope detector employing principles of the invention; and Fig. 2 is a detailed circuit diagram of a detector also employing principles of the invention.

In some respects, the detector shown in Fig. 1 is similar to detectors of the cathode follower type, sometimes known as infinite impedance detectors, since the storage condenser C is connected in the cathode 11 circuit of a vacuum tube 10. A train of pulses *a* which may, for example, comprise the synchronizing pulses from a television signal, is applied to the control grid 12 of tube 10. These pulses charge the condenser C to a voltage approaching the peak value of the pulses. The tube 10 is cut off between pulses. A discharge path for the condenser is provided through the resistor 13 and switch 14 to effect an average rate of charge removal which is balanced by the tube each time an input pulse turns it on. Were it not for the switch 14, however, relatively wide pulses would turn the tube on for a longer time, and the storage condenser C would tend to charge to a higher potential. Also, if the repetition rate of the pulses were not regular, the condenser C would tend to discharge more between the wider spaced pulses; both of these effects would introduce distortion on the envelope voltage.

In accordance with one feature of the invention, however, the switch 14 is connected in the discharge path of the condenser C. This switch is turned off or opened between pulses and permits charge removal only during the input pulse interval. Under equilibrium conditions and with no amplitude variation of the input pulses, the rate of condenser charge is always proportional to the rate of discharge regardless of pulse duration or repetition rate.

A more detailed circuit for accomplishing the objects of the invention is illustrated in Fig. 2. A cathode follower stage 21, having a cathode load resistor 20, provides the drive on the envelope detector which comprises a detector tube 22 having a storage condenser C connected in its cathode circuit and a discharge tube 23 whose anode-cathode circuit includes the condenser C. Although triodes are illustrated, tetrodes or pentodes might be employed for either or both of the detector and discharge tubes 22 and 23. Also, the detector tube could be a diode of either the vacuum or semiconductor type.

Assuming the input to the cathode follower stage 21, wave form *a*, to be the synchronizing pulses of a video signal, the envelope detector will derive an output wave form *b* which resembles, as closely as possible, the low frequency distortion present in the signal from which the synchronizing pulses were obtained. This distortion is represented by low frequency variations in the amplitude of the synchronizing pulses.

The input pulses *a* are applied to the control grids of both the detector tube 22 and the discharge tube 23 so that during the synchronizing pulse intervals, tube 23 is caused to discharge the storage condenser C at a relatively constant rate according to the applied bias potentials. The charge tube 22 in these intervals charges the storage condenser C according to the amplitude of the input pulses. Between pulses, the discharge tube 23 is cut off so that the condenser C will hold its charge until the next pulse arrives. By virtue of this action, the detector output voltage is rendered relatively insensitive to changes in pulse duration or pulse separation such as occurs, for example, between the video horizontal and vertical synchronizing pulses and the equalizing pulses. This is achieved by permitting the condenser C to charge and discharge only during the intervals of the synchronizing pulses and by balancing the effective rate of charge removal with the charging rate so that in the absence of distortion, the net charge applied to the condenser will be zero.

Between pulses, the potential on the storage condenser C holds the cathode 24 of the detector tube at cut-off well above its grid 25 potential. The discharge tube 23 is held at cut-off also by the potential across its coupling condenser 26 and parallel resistor 27. During the synchronizing pulse interval, the discharge tube 23 is driven to saturation and caused to draw grid current so that the coupling condenser 26 charge is maintained. This parallel resistor and capacitor 26—27 act in effect as a series battery to compensate for the direct-current potential between the detector and discharge tubes, noting that they have a common input at the cathode of the driving tube.

Therefore, during the interval between pulses, both tubes are cut off as a result of their steady state bias. Upon the arrival of a synchronizing pulse at the cathode of the driving tube 21, the discharge tube 23 conducts first, partially discharging the output condenser C. When the pulse amplitude increases sufficiently to raise the grid 25 potential of the detector tube 22 to the conduction value of bias with respect to its cathode 24, this tube also conducts, recharging the condenser C. In the presence of distortion, the rate of charge and discharge are proportioned so that before the pulse expires the condenser voltage reaches the amplitude of the input pulse.

The discharge tube 23 may be thought of as a resistance which is switched in and out of the circuit, being switched in only in the presence of synchronizing pulses. The action of this tube is necessary to permit the voltage of condenser C, wave form *b*, to follow the level of the synchronizing pulse tips during that portion of the distortion envelope when the levels of the pulse tips are successively decreasing. This is accomplished without producing significant charge distortion during the vertical synchronizing pulses and equalizing pulses.

In the application of this circuit to a television clamper, it is necessary to give the detector a certain time constant. This time constant is initially determined by the effective resistance of the detector tube 22 and the magnitude of the storage capacitor C. The time constant may be altered, if necessary, by varying the magnitude of the storage capacitor or, as indicated, by the addition of a series resistor 28 in the charging circuit.

It will be noted that the same pulses are applied to the detector and discharge tubes. In accordance with further principles of the invention, a cathode resistor 29 is added to the discharge tube primarily to reduce the gain of the discharge tube to the proper value so that during the pulse interval, the condenser follows the amplitude of the pulses applied to it by way of the detector tube and not by way of the discharge tube. This reduction is also necessary in the application of this detector in the clamper described in the above-cited copending application for purposes of stability, since the discharge tube in that circuit represents a positive feedback element.

The voltage on the condenser which represents a quantized-in-time version of the low frequency distortion wave, is applied to an output circuit 30. If the impedance of this circuit is finite, some of the charge will leak off between pulses. This discharge, however, is compensated for by a positive bias applied to the condenser through the resistor 31 which replaces the charge at the same rate. Plate supply for the discharge tube 23 is also supplied by way of resistor 31 and resistor 28.

Although the invention has been described as relating to a specific embodiment, it should not be deemed limited to the specific circuit shown, since other modifications and embodiments will readily occur to one skilled in the art. For example, the invention is not limited to envelope detectors for television clampers but is applicable to other types of signals and applications.

What is claimed is:

1. An envelope detector for a train of substantially unidirectional pulses varying in amplitude about a reference value comprising a condenser for storing voltages proportional to amplitude variations of input pulses relative to the reference value, a charging path for said condenser comprising a first vacuum tube having at least an anode, a cathode and a control grid, said charging path including said condenser connected in circuit with said cathode, a discharging path for said condenser comprising a second vacuum tube having at least an anode, a cathode and a control grid, said discharging path including said condenser connected in circuit with said last-mentioned anode and cathode, means for holding said second tube at cutoff during the time intervals between successive input pulses, said means comprising a resistor and a further condenser connected in parallel, said last-mentioned resistor and condenser having one common terminal connected to the grid of said second tube, said first tube being held at cutoff during said last-mentioned time intervals by the voltage charge on said storing condenser, means for applying the input pulses simultaneously to said grid of said first tube and a second common terminal of said resistor and further condenser, said second tube being driven into conduction to partially discharge said storing condenser substantially at a constant rate in response to input pulses of one amplitude relative to said reference value, said first tube being driven into conduction to increase the charge on said storing condenser in response to input pulses of a different amplitude relative to said reference value, said charging and discharging paths having such mutual time rates that the net voltage charge placed on said storing condenser is substantially zero in response to input pulses of an amplitude substantially equal to said reference value, said charging and discharging paths having such further mutual time rates that the voltage charge on said storing condenser reaches a magnitude which is substantially equal to the amplitude of the input pulses during the occurrences thereof, and means to reduce the gain of said second tube for permitting said last-mentioned condenser to receive charge through said first tube, said last-mentioned means comprising an unbypassed resistor connected in the cathode circuit of said second tube.

2. The envelope detector according to claim 1 which includes a load circuit having a predetermined impedance and connected across said storing condenser so that the voltage across said last-mentioned condenser tends to discharge therethrough, and means for applying a bias of preselected polarity to said storing condenser thereby tending to replace the voltage charge thereon substantially at the same rate at which such voltage tends to discharge through said load.

3. The envelope detector according to claim 1 which includes a second resistor connected between said first-mentioned cathode and said first-mentioned condenser, said second resistor being also connected between said second-mentioned anode and said first-mentioned condenser, said second resistor altering the time constant of a circuit including said first-mentioned tube and condenser.

References Cited in the file of this patent

UNITED STATES PATENTS

| | | |
|---|---|---|
| 2,451,632 | Oliver | Oct. 19, 1948 |
| 2,466,705 | Hoeppner | Apr. 12, 1949 |
| 2,568,213 | Bath | Sept. 18, 1951 |
| 2,609,533 | Jacobsen | Sept. 2, 1952 |
| 2,664,504 | Bennett | Dec. 29, 1953 |